United States Patent
Cao et al.

(10) Patent No.: US 12,368,883 B2
(45) Date of Patent: Jul. 22, 2025

(54) BLOCK VECTOR DIFFERENCE BINARIZATION AND CODING IN VIDEO CODING

(71) Applicant: QUALCOMM Incorporated, San Diego, CA (US)

(72) Inventors: Keming Cao, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 18/177,591

(22) Filed: Mar. 2, 2023

(65) Prior Publication Data
US 2023/0328272 A1 Oct. 12, 2023

Related U.S. Application Data

(60) Provisional application No. 63/362,782, filed on Apr. 11, 2022.

(51) Int. Cl.
*H04N 19/513* (2014.01)
*H04N 19/70* (2014.01)

(52) U.S. Cl.
CPC ........... *H04N 19/521* (2014.11); *H04N 19/70* (2014.11)

(58) Field of Classification Search
CPC .............................. H04N 19/521; H04N 19/70
See application file for complete search history.

(56) References Cited

U.S. PATENT DOCUMENTS

| | | | | |
|---|---|---|---|---|
| 11,729,411 | B2 * | 8/2023 | Lim | H04N 19/51 |
| | | | | 382/236 |
| 2008/0240252 | A1 * | 10/2008 | He | H04N 19/86 |
| | | | | 375/E7.176 |
| 2015/0098504 | A1 * | 4/2015 | Pang | H04N 19/593 |
| | | | | 375/240.12 |
| 2015/0264386 | A1 | 9/2015 | Pang et al. | |
| 2015/0382010 | A1 * | 12/2015 | Rapaka | H04N 19/139 |
| | | | | 375/240.16 |
| 2016/0227214 | A1 * | 8/2016 | Rapaka | H04N 19/186 |
| 2016/0277770 | A1 * | 9/2016 | Hong | H04N 19/124 |
| 2020/0351521 | A1 * | 11/2020 | Xu | H04N 19/105 |

(Continued)

FOREIGN PATENT DOCUMENTS

CN 107079162 * 8/2015

OTHER PUBLICATIONS

Xu, Xiao-zhong translation of CN 107079162 Aug. 26, 2015 (Year: 2015).*

(Continued)

*Primary Examiner* — Zaihan Jiang
(74) *Attorney, Agent, or Firm* — Shumaker & Sieffert, P.A.

(57) ABSTRACT

A method of encoding or decoding video data includes determining that a block vector difference (BVD) value is non-zero, wherein the BVD value is indicative of a difference between a block vector for a current block of the video data and a block vector predictor, and wherein the block vector points to a reference block based on samples in a same picture as the current block; and encoding or decoding a value for the BVD value, without signaling or parsing syntax information indicating whether an absolute value of the BVD value is greater than one.

18 Claims, 8 Drawing Sheets

(56) References Cited

U.S. PATENT DOCUMENTS

2022/0086451 A1\* 3/2022 Bae .............. H04N 19/176
2022/0182621 A1\* 6/2022 Iwamura .............. H04N 19/157
2022/0182646 A1\* 6/2022 Iwamura ................ H04N 19/91

OTHER PUBLICATIONS

Cao K., et al., "EE2-Related: Block Vector Difference Binarization", JVET-Z0131-v2, Joint Video Experts Team (JVET) of ITU-T SG 16 WP 3 and ISO/IEC JTC 1/SC 29, 26th Meeting, by teleconference, Apr. 20-29, 2022, pp. 1-3.

Coban M., et al., "Algorithm Description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

Huang H., et al., "CE2: Worst-Case Memory Bandwidth Reduction for Affine (Test 2-4.5)", JVET-N0256, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-6.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Robert A., et al., "EE2-3.6: Combined Tests Involving EE2-3.4", JVET-Z0095-v2, Joint Video Experts Team (JVET) of ITU-T SG 16 WP 3 and ISO/IEC JTC 1/SC 29, 26th Meeting, by teleconference, Apr. 20-29, 2022, pp. 1-6.

Seregin V., et al., "Exploration Experiment on Enhanced Compression beyond VVC capability (EE2)", JVET-Y2024-v2, Joint Video Experts Team (JVET) of ITU-T SG 16 WP 3 and ISO/IEC JTC 1/SC 29, 25th Meeting, by eleconference, Jan. 12-21, 2022, pp. 1-15.

International Search Report and Written Opinion—PCT/US2023/015804—ISA/EPO—Jun. 26, 2023 (12 pp).

Laroche G., et al., "AHG5: Motion prediction for Intra Block Copy", 15. JCTVC Meeting, Oct. 23, 2013-Nov. 11, 2013, Geneva, (Joint Collaborative Team on Video Coding of ISO/IEC JTC1/SC29/WG11 and ITU-T SG.16 ), No. JCTVC-O0122, Oct. 23, 2013, pp. 1-5, XP030238559.

Pang C., et al., "Non-RCE3: Intra Motion Compensation with 2-D MVs", 14. JCT-VC Meeting, Jul. 25, 2013-Feb. 8, 2013, Vienna, (Joint Collaborative Team on Video Coding of ISO/IEC JTC1/SC29/WG11 and ITU-TSG .16 ), No. JCTVC-N0256, Aug. 2, 2013, pp. 1-12, XP030114777.

Rapaka K., et al., "CE1 : Results of Test 1.1, Test 2.1 and Test 3.1", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,, No. JCTVC-S0142, Oct. 8, 2014 (Oct. 8, 2014), XP030116910 (13 pp).

\* cited by examiner

BLOCK VECTOR DIFFERENCE BINARIZATION AND CODING IN VIDEO CODING

This application claims the benefit of U.S. Provisional Patent Application 63/362,782, filed Apr. 11, 2022, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding a block vector difference (BVD). A BVD may be indicative of a difference between a block vector (e.g., actual block vector) of a current block and a block vector predictor. A block vector is a vector for the current block that identifies another block in the same picture as the current block. A video encoder may signal the BVD, and a video decoder may receive the BVD. This disclosure describes example techniques of coding the BVD that may decrease the amount of information that needs to be signaled and/or reduce the complexity of utilizing BVD as a coding tool.

In one or more examples, a video encoder may signal, and a video decoder may parse syntax information that indicates that a BVD value for a BVD is non-zero. However, the video encoder may not signal, and the video decoder may not parse additional syntax information that indicates whether the BVD value is greater than one. Because the video encoder need not signal, and the video decoder need not parse the additional syntax information that indicates whether the BVD value is greater than one, there may be a reduction in the amount of syntax information that is signaled.

In one example, the disclosure describes a method of encoding or decoding video data, the method comprising: determining that a block vector difference (BVD) value is non-zero, wherein the BVD value is indicative of a difference between a block vector for a current block of the video data and a block vector predictor, and wherein the block vector points to a reference block based on samples in a same picture as the current block; and encoding or decoding a value for the BVD value, without signaling or parsing syntax information indicating whether an absolute value of the BVD value is greater than one.

In one example, the disclosure describes a device for encoding or decoding video data, the device comprising: memory configured to store video data; and processing circuitry configured to: determine that a block vector difference (BVD) value is non-zero, wherein the BVD value is indicative of a difference between a block vector for a current block of the video data and a block vector predictor, and wherein the block vector points to a reference block based on samples in a same picture as the current block; and encode or decode a value for the BVD value, without signaling or parsing syntax information indicating whether an absolute value of the BVD value is greater than one.

In one example, the disclosure describes a computer-readable storage medium storing instructions thereon that when executed cause one or more processors to: determine that a block vector difference (BVD) value is non-zero, wherein the BVD value is indicative of a difference between a block vector for a current block of video data and a block vector predictor, and wherein the block vector points to a reference block based on samples in a same picture as the current block; and encode or decode a value for the BVD value, without signaling or parsing syntax information indicating whether an absolute value of the BVD value is greater than one.

The details of one or more examples are set forth in the accompanying drawings and the description below. Other features, objects, and advantages will be apparent from the description, drawings, and claims.

DETAILED DESCRIPTION

Figure 1:
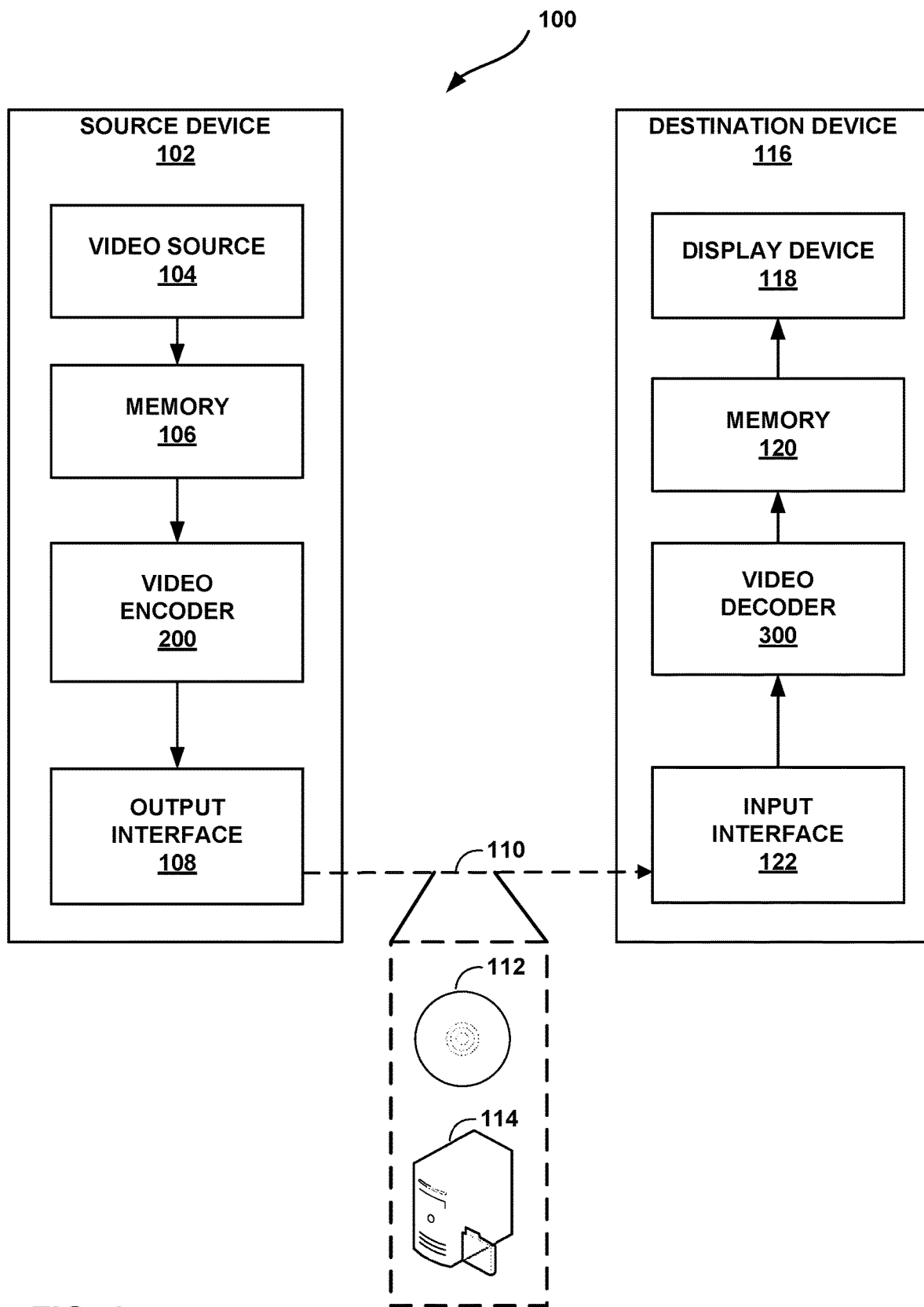
FIG. 1 is a block diagram illustrating an example video encoding and decoding system that may perform the techniques of this disclosure.

Video coding includes an intra-block copy (IBC) video coding tool. In IBC, a video encoder determines a block vector for a current block. A block vector identifies another block in the same picture as the current block. The video encoder determines a prediction block from the other block in the same picture, and determines a residual (e.g., difference) between the current block and the residual block. The video encoder may signal information indicative of the residual.

In some examples, the video encoder may signal information indicative of the block vector. However, to reduce the amount of information that is signaled, rather than signaling information indicative of the block vector, the video encoder may determine a block vector predictor, and a difference between the block vector and the block vector predictor. The difference between the block vector and the block vector predictor is referred to as the block vector difference (BVD). The video encoder may signal information indicative of the BVD.

A video decoder may receive the residual information (e.g., difference between the current block and the prediction block) and information indicative of the BVD. The video decoder may determine the BVD from the signaled information, and determine the block vector predictor using the same techniques that the video encoder used to determine the block vector predictor (including based on information signaled by the video encoder). The video decoder may add the BVD to the block vector predictor to reconstruct the block vector for the current block. From the block vector, the video decoder may determine the prediction block. The video decoder may add the prediction block to the residual information to reconstruct the current block.

There may be various ways in which the video encoder may signal information indicative of the BVD. As one example, the video encoder may perform a binarization technique to binarize the value of the BVD. For instance, the BVD may include a horizontal component and a vertical component, and, in one or more examples, the video encoder may perform a binarization technique to binarize the horizontal and vertical components. The result of the binarization may be a plurality of bins. In one or more examples, the video encoder may context-based encode the values of one or more bins representing the horizontal and vertical components.

The video decoder may perform the inverse process as the video encoder to determine the value for the BVD. For instance, the video decoder may perform context-based decoding to determine the values for the bins of the horizontal and vertical components of the BVD to determine the binarized values of the BVD. The video decoder may perform inverse binarization to determine the values of the BVD.

The binarization and inverse binarization techniques, and the context-based encoding and decoding techniques may impact the amount of information that is signaled, and the complexity of the encoding and decoding process. This disclosure describes example binarization and inverse binarization techniques, and context-based encoding and decoding techniques that may promote reduction in signaling (e.g., by reducing the amount of information that needs to be transmitted and received) while balancing complexity to ensure timely decoding of video data.

For instance, this disclosure describes example techniques of reducing the amount of information that needs to be signaled, relative to other techniques. As described in more detail, rather than signaling the values for the BVD components, a video encoder may signal and a video decoder may parse flags that indicate whether absolute value of the BVD value (e.g., absolute value of one or both of the x and y-components of the BVD) is greater than a threshold.

In one or more examples, the video encoder may signal and the video decoder may parse a first flag that indicates whether the absolute value of the BVD value is greater than zero (also called gt0 flag). If the greater than zero flag is true, then the BVD value is non-zero. In one or more examples, for non-zero BVD values, the video encoder may signal, and the video decoder may parse a value for the BVD value (e.g., the value of the BVD value may be equal to the absolute value of the BVD value minus one). In such examples, the video encoder may not signal, and the video decoder may not parse syntax information indicating whether an absolute value of the BVD value is greater than one.

Some techniques utilize a greater than one flag that indicates whether the BVD value is greater than one or not. With the example techniques described in this disclosure, such a greater than one flag may not needed, which reduced signaling overhead. Also, signaling smaller values tends to require less bandwidth compared to larger values. Therefore, the video encoder signaling a value for the BVD value, where the value is equal to absolute value of the BVD value minus one, results in the video encoder signaling a smaller value, which in turn results in less bandwidth usage.

Moreover, in one or more examples, this disclosure describes examples of coding techniques that may provide bandwidth gains. For example, the value for the BVD value (e.g., BVD value minus one) may be represented as a codeword (e.g., an Exponential-Golomb codeword). The video encoder and the video decoder may context-based encode or decode the codeword. In some examples, the video encoder and the video decoder may context-based encode or decode a first N bins (e.g., 5 bins) of the codeword, and bypass encode or decode the remaining bins of the codeword.

For context-based coding, the video encoder and the video decoder may utilize one or more contexts. In some examples, the video encoder and the video decoder may utilize a first set of one or more contexts to encode or decode a horizontal component value of the BVD, and utilize a second set of one or more contexts to encode or decode a vertical component value of the BVD, where the first and second contexts are different. As another example, the contexts used for BVD encoding or decoding may be different than the contexts used for motion vector difference (MVD) encoding or decoding. An MVD may be similar to a BVD, but indicative of a difference between a motion vector and motion vector predictor, where a motion vector points to samples in a different picture. By utilizing different contexts, as described in this disclosure, the likelihood of better compression of the horizontal and/or vertical components of the BVD may be increased as compared to techniques that require the same contexts for the horizontal and vertical components of the BVD and/or same contexts for the BVD and MVD.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for block vector difference (BVD) binarization and coding in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for BVD binarization and coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format.

In general, video encoder 200 and video decoder 300 may be configured to perform the techniques of this disclosure in conjunction with any video coding techniques that use intra-block copy (IBC). In IBC, video encoder 200 determines a block vector for a current block. A block vector identifies another block in the same picture as the current block. Video encoder 200 determines a prediction block from the other block in the same picture, and determines a residual (e.g., difference) between the current block and the residual block. Video encoder 200 may signal information indicative of the residual.

In some examples, video encoder 200 may signal information indicative of the block vector. However, to reduce the amount of information that is signaled, rather than signaling information indicative of the block vector, video encoder 200 may determine a block vector predictor, and a difference between the block vector and the block vector predictor. The difference between the block vector and the block vector predictor is referred to as the block vector difference (BVD). Video encoder 200 may signal information indicative of the BVD.

Video decoder 300 may receive the residual information (e.g., difference between the current block and the prediction block) and information indicative of the BVD. Video decoder 300 may determine the BVD from the signaled information, and determine the block vector predictor using the same techniques that video encoder 200 used to determine the block vector predictor (including based on information signaled by video encoder 200). Video decoder 300 may add the BVD to the block vector predictor to reconstruct the block vector for the current block. From the block vector, video decoder 300 may determine the prediction block. Video decoder 300 may add the prediction block to the residual information to reconstruct the current block.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to perform the example techniques which may improve the coding efficiency and performance of intra-block copy (IBC) in an enhanced compression model (ECM) beyond VVC. The example techniques may be applicable to the ECM or other video codecs.

Figure 6:
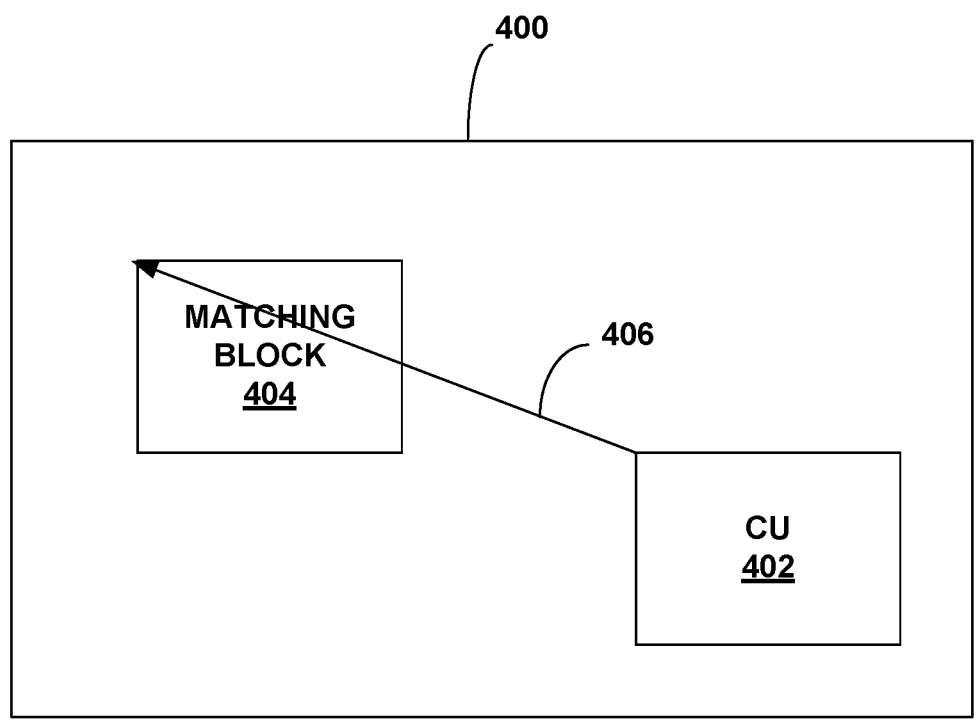
FIG. 6 is a conceptual diagram illustrating an example of a coding unit (CU) having a matching block identified by a block vector for intra block copy (IBC).

Intra Block Copy (IBC), described in C. Pang, J. Sole, L. Guo, M. Karczewicz, and R. Joshi, "Non-RCE3: Intra Motion Compensation with 2-D MVs", JCTVC-N0256, Vienna, AT, August 2013, is one of the coding tools for screen content. For the current coding unit (CU), IBC will search all block vectors and find the best matching block in the reference region as prediction as shown in FIG. 6. For instance, FIG. 6 illustrates picture 400 that includes CU 402. Block vector 406 of CU 402 identifies matching block 404 within the same picture 400.

Video encoder 200 may generate a prediction of the chosen block vector 406, referred to as a block vector predictor. Video encoder 200 may determine a difference between the chosen block vector 406 and the predicted block vector (i.e., the block vector predictor). The result of the difference is known as a block vector difference (BVD). Video encoder 200 may signal information indicative of the BVD in the bitstream.

In one or more examples, video encoder 200 may binarize the values for the BVD (e.g., binarize the values for a horizontal and a vertical component of the BVD) to generate a codeword. Video decoder 300 may be configured to perform the inverse binarization (e.g., convert the codeword back to a value). Fixed length coding is one example technique of binarization. A number, which is known to be smaller than two to the power of N, can be binarized into a binary number of length N. The number is converted to binary first and then 0s are appended to the most significant positions to make the length of binarization to be N.

Table 1 provides examples for fixed-length coding of length 3.

TABLE 1

Example for Fixed-Length Code of length 3

| Number | Codeword |
|---|---|
| 0 | 000 |
| 1 | 001 |
| 2 | 010 |
| 3 | 011 |
| 4 | 100 |
| 5 | 101 |
| 6 | 110 |
| 7 | 111 |

Exponential-Golomb coding is also a technique of binarization and exponential-Golomb coding can be generalized to order K. Exponential-Golomb coding may include dividing the whole non-negative number set into groups of different numbers for each group. Exponential-Golomb binarization techniques may include converting a non-negative number into the index of the group that the number belongs to and in what position the number is located in the group. Exponential-Golomb coding includes two parts, prefix and suffix. The prefix is to denote the index of group, and the prefix can be coded with unary coding. The suffix denotes the position inside this group, and is coded with fixed length coding. Order K indicates that the size of the first group should be $2^K$ and the size of the following groups should be $2^{K+1}, 2^{K+2}, \ldots$.

Table 2 provides examples for Exponential-Golomb coding with order 1.

TABLE 2

Example for Exponential-Golomb Code with order 1

| Number | Group | Prefix | Position in Group | Suffix | Codeword |
|---|---|---|---|---|---|
| 0 | 0 | 0 | 0 | 0 | 00 |
| 1 | 0 | 0 | 1 | 1 | 01 |
| 2 | 1 | 10 | 0 | 00 | 1000 |
| 3 | 1 | 10 | 1 | 01 | 1001 |
| 4 | 1 | 10 | 2 | 10 | 1010 |
| 5 | 1 | 10 | 3 | 11 | 1011 |
| 6 | 2 | 110 | 0 | 000 | 110000 |
| 7 | 2 | 110 | 1 | 001 | 110001 |
| 8 | 2 | 110 | 2 | 010 | 110010 |
| 9 | 2 | 110 | 3 | 011 | 110011 |
| 10 | 2 | 110 | 4 | 100 | 110100 |

There may be certain issues with coding BVD. In current ECM software, available at https://vcgit.hhi.fraunhofer.de/ecm/ECM/-/tree/ECM-4.0, the binarization method for BVD is described as follows. There is one context-coded flag signaled to indicate whether the BVD is zero. If this context-coded flag is false, then the BVD value is non-zero. If the BVD value is non-zero, there is another context-coded flag signaled to indicate whether the absolute value of the BVD is one (e.g., or greater than one). If the absolute value of the BVD is neither zero nor one, two is subtracted from the absolute value and the remaining value of the absolute BVD is coded with Exponential-Golomb (EG) code of order 1 with equal probability. The sign of the BVD is signaled after with equal probability.

In some example implantations, the context-coded flags that are used for BVD share the same context with Motion Vector Difference (MVD), and the coding for the horizontal BVD and the vertical BVD is independent. MVD may be similar to BVD, except MVD represents a difference between a motion vector and a motion vector predictor. A motion vector for a block refers to a block in a different picture, unlike a block vector for a block that refers to a block in the same picture.

The binarization and coding techniques described above may not provide sufficient compression, resulting in inefficient bandwidth utilization. This disclosure describes example binarization and coding techniques that may provide additional compression relative to some other techniques.

Several example techniques are described in this disclosure addressing the aforementioned issues. The example techniques can be used individually or in any combination.

In one example, BVD and MVD use separate contexts. For example, video encoder 200 and video decoder 300 may code (e.g., encode or decode), utilizing a first set of one or more contexts, a BVD for a block vector for a first block in a first picture. The block vector for the first block identifies samples in the first picture, and the BVD is indicative of a difference between the block vector and a block vector predictor. Video encoder 200 and video decoder 300 may code (e.g., encode or decode), utilizing a second set of one or more contexts, a motion vector difference (MVD) for a motion vector for a second block in a second picture of the video data. The motion vector for the second block identifies samples in a picture different than the second picture, and the MVD is indicative of a difference between the motion vector and a motion vector predictor. In one or more examples, one or more contexts in the first set of contexts and the second set of contexts are different.

In one example, BVD is firstly checked to be zero or not. For instance, as part of rate-distortion calculations, video encoder 200 may determine a BVD value for the BVD, and the BVD value may be non-zero. From the perspective of video decoder 300, video decoder 300 may receive a flag that indicates that the BVD value is non-zero.

Then EG code is directly applied to BVD without checking whether the absolute value of BVD is one. For example, a context-coded flag is signaled to indicate whether BVD is zero or not. Then EG code, for example of order 1, is applied to code the absolute value of BVD minus 1.

For example, video encoder 200 or video decoder 300 may determine whether a block vector difference (BVD) is zero or not, where the BVD is indicative of a difference between a block vector for a current block of the video data and a block vector predictor. Video encoder 200 and video decoder 300 may context-based code (e.g., encode or decode) the BVD based on the BVD being non-zero, without determining whether an absolute value of the BVD is one.

For instance, video encoder 200 may convert a value (e.g., the absolute value of the BVD minus one) used to indicate the BVD value into a codeword (e.g., Exponential-Golomb codeword). Video encoder 200 may context-based encode the codeword, and signal the resulting encoded codeword. Video decoder 300 may context-based decode the encoded codeword to determine the codeword. From the codeword, video decoder 300 may (e.g., via inverse-binarization) determine the value used to indicate the BVD value (e.g., the absolute value of the BVD minus one). Video decoder 300 may then add one to the value used to indicate the BVD value to determine the BVD value. As described, from the BVD value and the block vector predictor, video decoder 300 may determine the block vector (e.g., by adding the BVD value and the block vector predictor). From the block vector, video decoder 300 may determine a prediction block, and from the prediction block and signaled residual information, video decoder 300 may reconstruct the block.

In one example, after checking if the BVD is zero or not, the absolute value of BVD is compared with a threshold. One flag indicating whether the absolute value is greater than the threshold or not is signaled. If the absolute value is less or equal to the threshold, one binarization or inverse binarization technique is applied, otherwise, another binarization or inverse binarization technique is applied. As one example, first, whether the BVD is zero or not is checked and a flag is signaled. Then the absolute value of BVD is compared with threshold, for example 4, if it is less or equal to 4, context-coded flag 0 is signaled, and fix-length coding is applied on the absolute value of BVD minus 1. Otherwise, context-coded flag 1 is signaled and the EG (e.g., Exponential-Golomb) code, for example with order 3, is applied on the absolute value of BVD minus threshold.

In one example, first, whether the BVD is zero or not is checked and a flag is signaled. Then the absolute value of BVD is compared with threshold, for example 6, if it is less or equal to 6, context-coded flag 0 is signaled, and truncated binary coding is applied on the absolute value of BVD minus 1. Otherwise, context-coded flag 1 is signaled and the EG code, for example with order 4, is applied on the absolute value of BVD minus threshold.

For example, video encoder 200 or video decoder 300 may determine whether a block vector difference (BVD) is zero or not, where the BVD is indicative of a difference between a block vector for a current block of the video data and a block vector predictor. Based on the BVD being non-zero, video encoder 200 and video decoder 300 may determine whether the BVD is less than or equal to a threshold (e.g., video encoder 200 may compare BVD to threshold, and video decoder 300 may receive signaling indicative of whether BVD is less than or equal to threshold). Video encoder 200 and video decoder 300 may select a binarization or inverse binarization technique based on whether the BVD is less than or equal to a threshold, and apply the selected binarization or inverse binarization technique.

In one example, contexts can be used in the binarization coding method of BVD, either for a part of the binarization codeword or for the whole codeword. In one example, the part of the binarization codeword can be the first N bins. In another example the context coded part can be a prefix (e.g., prefix part of EG code or prefix part of the concatenated codeword). There may be two or more binarization codewords to form the concatenated codeword, where the prefix is part of the concatenated codeword.

For one example, the first 5 bins of EG code, for example with order 1, are context-coded and the remaining codeword is coded with equal probability, i.e., without context coding. In another example, the first 5 bins of the prefix part of EG code, for example with order 1, are context-coded and the remaining codeword is coded with equal probability (e.g., bypass coding). In another example, the whole codeword of fix-length coding method is context-coded. In another example, the first N bins, for example 5 bins, of the truncated binary coding method is context-coded.

In one or more examples, video encoder 200 and video decoder 300 may context-code (e.g., encode or decode), utilizing one or more contexts, a block vector difference (BVD), where the BVD is indicative of a difference between a block vector for a current block of the video data and a block vector predictor. The context-coding may include utilizing the one or more contexts for a part of a binarization codeword of the BVD or for the whole binarization codeword of the BVD.

In one example, the binarization technique for BVD on horizontal and vertical components are different. For example, the binarization method of horizontal BVD component is as follows. First, check if the BVD is less or equal to a threshold, for example equal to 8. If the BVD is less or equal to the threshold, fix-length coding is applied, otherwise, EG code, for example with order 3, is applied. The binarization technique for vertical BVD component includes applying EG code, for example with order 2, directly without checking the threshold.

For example, video encoder 200 and video decoder 300 may be configured to binarize or inverse binarize a horizontal component of a block vector difference (BVD) utilizing a first binarization technique, where the BVD is indicative of a difference between a block vector for a current block of the video data and a block vector predictor. Video encoder 200 and video decoder 300 may binarize or inverse binarize a vertical component of the BVD utilizing a second binarization technique that is different than the first binarization technique.

In some examples, video encoder 200 and video decoder 300 may binarize or inverse binarize a horizontal and vertical component of a block vector difference (BVD) utilizing the same binarization technique, where the BVD is indicative of a difference between a block vector for a current block of the video data and a block vector predictor. Video encoder 200 and video decoder 300 may context-based code (e.g., encode or decode) the horizontal component, and context-based code the horizontal component.

In one example, the binarization technique for BVD horizontal and vertical components is the same, and the horizontal and vertical components share the same contexts. For example, context-based coding the horizontal component and context-based coding the vertical component may include context-based coding the vertical component and the horizontal component utilizing the same contexts.

In one example, the binarization technique for BVD horizontal and vertical components is the same, but the horizontal and vertical components use separate contexts. For example, context-based coding the horizontal component and context-based coding the vertical component may include context-based coding the vertical component and the horizontal component utilizing different contexts. As an example, video encoder 200 may encode or video decoder 300 may decode, utilizing a first set of one or more contexts, a horizontal component value of the BVD based on the BVD horizontal component value being non-zero, and encode or decode, utilizing a second set of one or more contexts, a vertical component value based on a BVD vertical component value of the BVD being non-zero. The one or more contexts in the first set of contexts and the second set of contexts are different.

In one example, the binarization technique for BVD horizontal and vertical components is the same, but the context of one component is dependent on the other component. For example, context-based coding the horizontal component and context-based coding the vertical component may include determining contexts for one of the horizontal component or the vertical component based on the other of the horizontal component or the vertical component.

As an example, the context of vertical component is separated for the cases when horizontal BVD is greater than zero, equal to zero, or less than zero. In another example, the context of vertical component is separated for cases when horizontal BVD is zero, or non-zero.

In one example, the binarization method of a BVD component is dependent on the sign of the other BVD component. For example, video encoder 200 and video decoder 300 may determine a binarization or inverse binarization technique for a first component of a block vector difference (BVD) based on whether a second component of the BVD is positive or negative, where the BVD is indicative of a difference between a block vector for a current block of the video data and a block vector predictor, and where the first component is one of a horizontal or vertical component of the BVD, and the second component is the other of the horizontal or vertical component of the BVD. Video encoder 200 and video decoder 300 may apply the determined binarization or inverse binarization technique.

As an example, the binarization technique of the vertical BVD is dependent on the sign of horizontal BVD component. When the horizontal BVD is positive, the binarization technique for vertical component may be EG code, for example with order 2. When the horizontal BVD component is negative, the binarization technique for the vertical component may be EG code, for example with order 1. When horizontal BVD is zero, the binarization technique for the vertical component may be fix-length coding.

In one example, the binarization technique of a BVD component may be dependent on the value of the other component. For example, video encoder 200 and video decoder 300 may determine a binarization or inverse binarization technique for a first component of a block vector difference (BVD) based on a value of a second component of the BVD, where the BVD is indicative of a difference between a block vector for a current block of the video data and a block vector predictor, and where the first component is one of a horizontal or vertical component of the BVD, and the second component is the other of the horizontal or vertical component of the BVD. Video encoder 200 and video decoder 300 may apply the determined binarization or inverse binarization technique.

As an example, the binarization technique of vertical BVD is dependent on the magnitude of the horizontal BVD component. When the horizontal BVD is greater than a threshold, for example equal to 8, the binarization technique of the vertical BVD component is EG code, for example with order 1. When the BVD for horizontal direction is less than the threshold, the binarization technique of the vertical BVD component may be fix-length coding.

In one example, BVD binarization technique may depend on the combination of sign for horizontal and vertical BVD components. For example, video encoder 200 and video decoder 300 may determine a binarization or inverse binarization technique for a first component of a block vector difference (BVD) and a second component of the BVD based on whether the first component and the second component are both positive, both negative, or one is positive and the other is negative, where the BVD is indicative of a difference between a block vector for a current block of the video data and a block vector predictor, and where the first component is one of a horizontal or vertical component of the BVD, and the second component is the other of the horizontal or vertical component of the BVD. Video encoder 200 and video decoder 300 may apply the determined binarization or inverse binarization technique.

As an example, when the sign combination of horizontal and vertical components is (+, +) and (−, −), EG, for example of order 3, may be utilized. When the sign combination is (+, −), the binarization technique for the horizontal component may be EG code, for example of order 2, and fix-length coding for the vertical component. When the sign combination is (−, +), the binarization technique of the horizontal component is EG code, for example of order 1, and EG code, for example of order 2, for the vertical component.

The examples described above can be used to binarize any vector, for example to code MVD. BVD vector was used as an example, and the techniques should not be considered limited to BVD.

Figure 2:
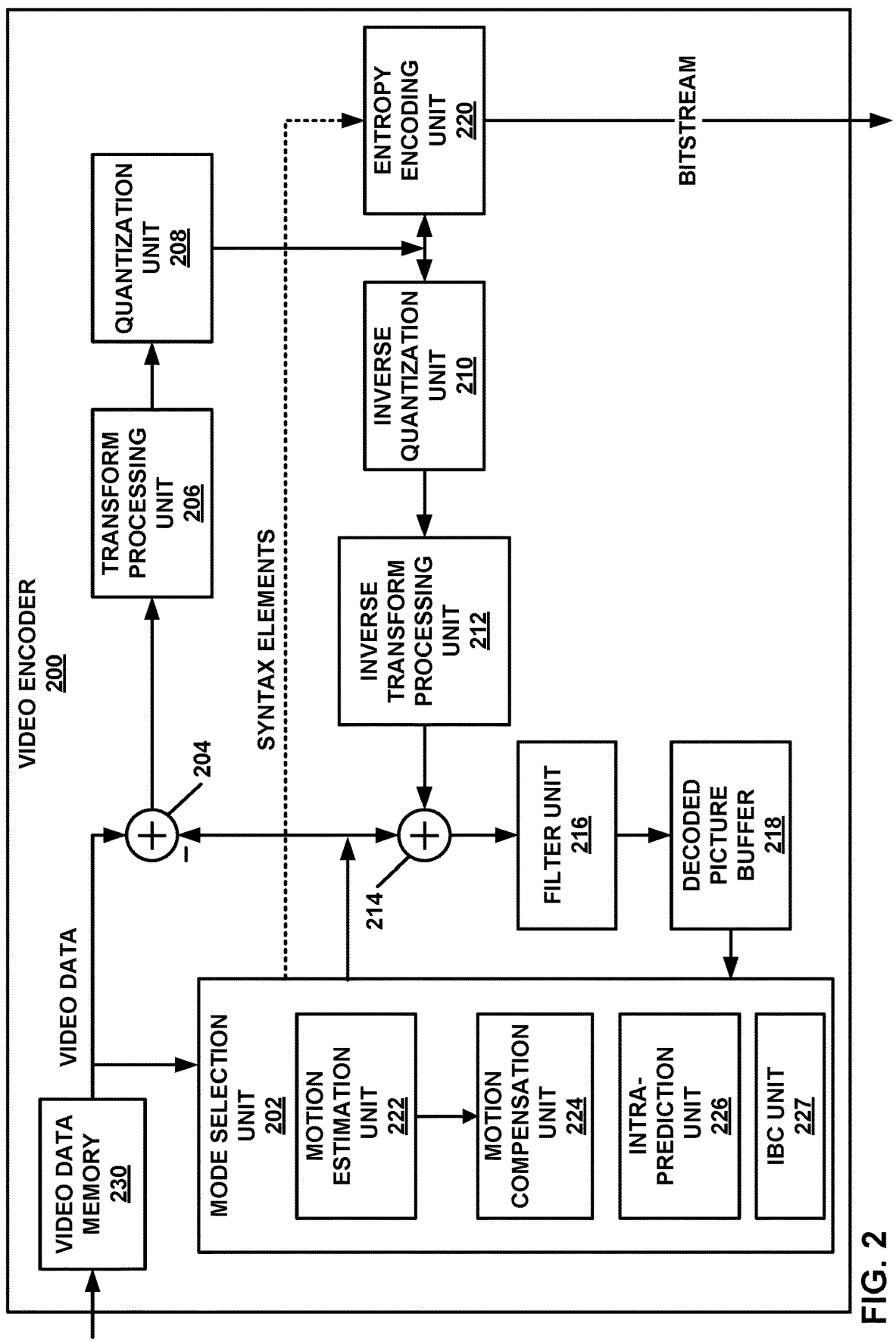
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, intra-block copy (IBC) unit 227, an affine unit, a linear model (LM) unit, or the like. In some examples, IBC unit 227 may be part of motion estimation unit 222 and/or motion compensation unit 224.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

As described above, the example techniques described in this disclosure are related to intra-block copy (IBC). Mode selection unit 202 may include IBC unit 227. IBC unit 227 may be configured to determine a block vector for a current block, and generate a prediction block for the current block based on the block vector. For instance, the block vector may identify a block within the same picture as the current block, and IBC unit 227 may determine the prediction block based on the samples within the block identified by the block vector. In one or more examples, IBC unit 227 may be configured to determine a block vector predictor for the block vector, and a BVD (e.g., difference between block vector and block vector predictor).

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an affine-mode coding and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the example techniques described in this disclosure, such as the various techniques for binarizing and encoding information indicative of the BVD.

For example, IBC unit 227 may determine that a block vector difference (BVD) value is non-zero. The BVD value is indicative of a difference between a block vector for a current block of the video data and a block vector predictor, and the block vector points to a reference block based on samples in a same picture as the current block. Entropy encoding unit 220 may encode a value for the BVD value, without signaling syntax information indicating whether an absolute value of the BVD value is greater than one.

As one example, a value, for the BVD value, is equal to the absolute value of the BVD value minus one. Entropy encoding unit 220 may encode the value that is equal to the absolute value of the BVD value minus one. In some examples, entropy encoding unit 220 may perform binarization (e.g., Exponential-Golomb) to represent the value as a codeword and encode the codeword. For example, entropy encoding unit 220 may context-based encode the codeword (e.g., a first N bins of the codeword and bypass encode the remaining bins of the codeword).

In some examples, entropy encoding unit 220 may utilize different contexts for encoding horizontal and vertical components of the BVD. For example, entropy encoding unit 220 may encode, utilizing a first set of one or more contexts, the horizontal component value based on the BVD horizontal component value being non-zero, and encode, utilizing a second set of one or more contexts, a vertical component value based on a BVD vertical component value being non-zero. The one or more contexts in the first set of contexts and the second set of contexts are different.

As another example, entropy encoding unit 220 may encode, utilizing a first set of one or more contexts, the value for the BVD value for a first block in a first picture, and encode, utilizing a second set of one or more contexts, a motion vector difference (MVD) for a motion vector for a second block in a second picture. The motion vector for the second block identifies a block in a picture different than the second picture, and the MVD is indicative of a difference between the motion vector and a motion vector predictor. In one or more examples, one or more contexts in the first set of contexts and the second set of contexts are different.

Figure 3:
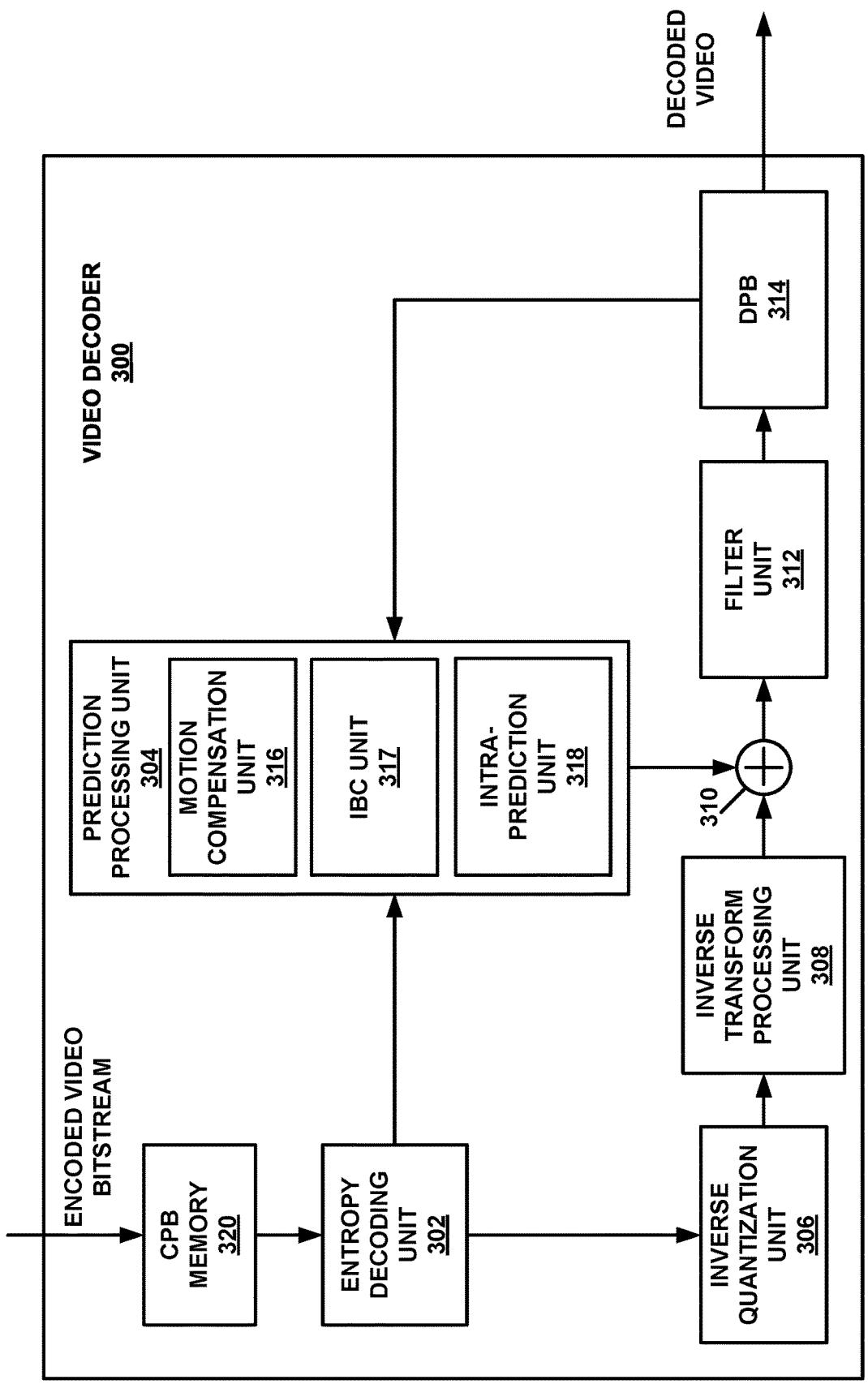
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316, intra-block copy (IBC) unit 317, and intra-prediction unit 318. In some examples, IBC unit 317 may be part of motion compensation unit 316. Prediction processing unit 304 may include additional units to perform prediction in accordance with other prediction modes. As examples, prediction processing unit 304 may include a palette unit, an affine unit, a linear model (LM) unit, or the like. In other examples, video decoder 300 may include more, fewer, or different functional components.

As described above, the example techniques described in this disclosure are related to intra-block copy (IBC). IBC unit 317 may be configured to determine a block vector for a current block, and generate a prediction block for the current block based on the block vector. For instance, the block vector may identify a block within the same picture as the current block, and IBC unit 317 may determine the prediction block based on the samples within the block identified by the block vector. In one or more examples, IBC unit 317 may be configured to determine a block vector predictor for the block vector, and receive information indicative of a BVD (e.g., difference between block vector and block vector predictor). IBC unit 317 may add the BVD to the block vector predictor to generate the block vector for the current block, and determine the prediction block for the current block based on the block vector.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the example techniques described in this disclosure, such as the various techniques for inverse binarizing and decoding information indicative of the BVD.

For example, IBC unit 317 may determine that a block vector difference (BVD) value is non-zero. The BVD value is indicative of a difference between a block vector for a current block of the video data and a block vector predictor, and the block vector points to a reference block based on samples in a same picture as the current block. Entropy decoding unit 302 may decode a value for the BVD value, without parsing syntax information indicating whether an absolute value of the BVD value is greater than one.

As one example, a value, for the BVD value, is equal to the absolute value of the BVD value minus one. Entropy decoding unit 302 may decode the value that is equal to the absolute value of the BVD value minus one. IBC unit 317 may add one to the value to determine the BVD value. From the BVD value, IBC unit 317 may determine the block vector (e.g., by adding the BVD value to the block vector predictor that video encoder 200 signaled). From the block vector, IBC unit 317 may determine a prediction block that IBC unit 317 outputs to reconstruction unit 310 to reconstruct the current block.

In some examples, entropy decoding unit 302 may perform inverse-binarization (e.g., Exponential-Golomb), such as in examples where the value is represented as a codeword and decode the codeword. For example, entropy decoding unit 302 may context-based decode the codeword (e.g., a first N bins of the codeword and bypass decode the remaining bins of the codeword).

In some examples, entropy decoding unit 302 may utilize different contexts for decoding horizontal and vertical components of the BVD. For example, entropy decoding unit 302 may decode, utilizing a first set of one or more contexts, the horizontal component value based on the BVD horizontal component value being non-zero, and decode, utilizing a second set of one or more contexts, a vertical component value based on a BVD vertical component value being non-zero. The one or more contexts in the first set of contexts and the second set of contexts are different.

As another example, entropy decoding unit 302 may decode, utilizing a first set of one or more contexts, the value for the BVD value for a first block in a first picture, and decode, utilizing a second set of one or more contexts, a motion vector difference (MVD) for a motion vector for a second block in a second picture. The motion vector for the second block identifies a block in a picture different than the second picture, and the MVD is indicative of a difference between the motion vector and a motion vector predictor. In one or more examples, one or more contexts in the first set of contexts and the second set of contexts are different.

Figure 4:
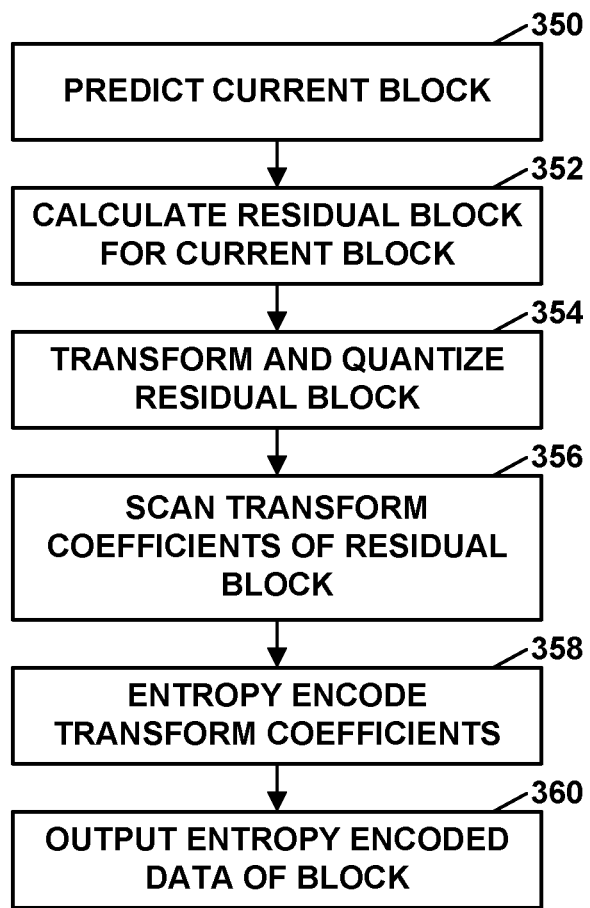
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block (e.g., based on a block vector for IBC). Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
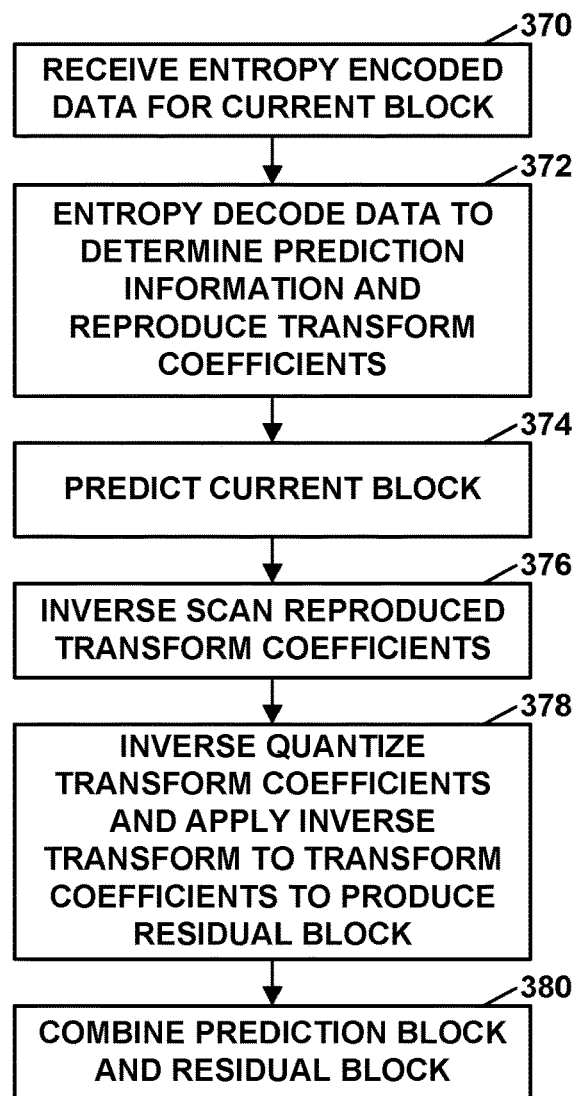
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using IBC mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 7:
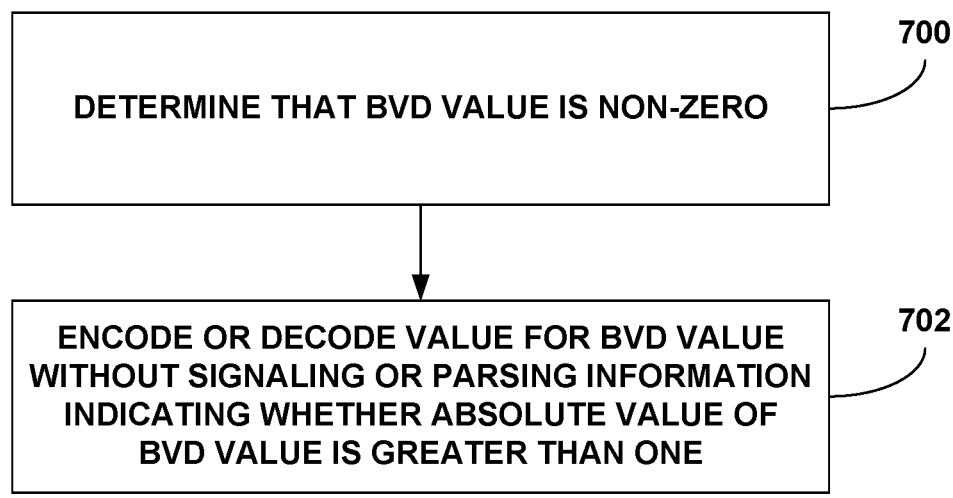
FIG. 7 is a flowchart illustrating an example method of encoding or decoding video data in accordance with the techniques of this disclosure.

FIG. 7 is a flowchart illustrating an example method of encoding or decoding video data in accordance with the techniques of this disclosure. Video encoder 200 and video decoder 300 may determine that a block vector difference (BVD) value is non-zero (700). For instance, video encoder 200, based on rate-distortion calculations, may determine that the optimal BVD is non-zero. Video decoder 300 may parse a first flag indicating that the BVD value is non-zero. As described, the BVD value is indicative of a difference between a block vector for a current block of the video data and a block vector predictor, and the block vector points to a reference block based on samples in a same picture as the current block.

Video encoder 200 and video decoder 300 may encode or decode a value for the BVD value, without signaling or parsing syntax information indicating whether an absolute value of the BVD value is greater than one (702). For example, video decoder 300 may decode the value without parsing a second flag indicating whether the absolute value of the BVD value is greater than one. The value (e.g., for the BVD value) may be equal to the absolute value of the BVD value minus one. In some In some examples, the value is represented as a codeword (e.g., an Exponential-Golomb codeword). In such examples, video encoder 200 and video decoder 300 may context-based encode or decode the codeword. As an example, to context-based encode or decode the codeword, video encoder 200 and video decoder 300 may context-based encode or decode a first N bins of the codeword and bypass encode or decode the remaining bins of the codeword. As an example, the first N bins is the first 5 bins of the codeword.

Figure 8:
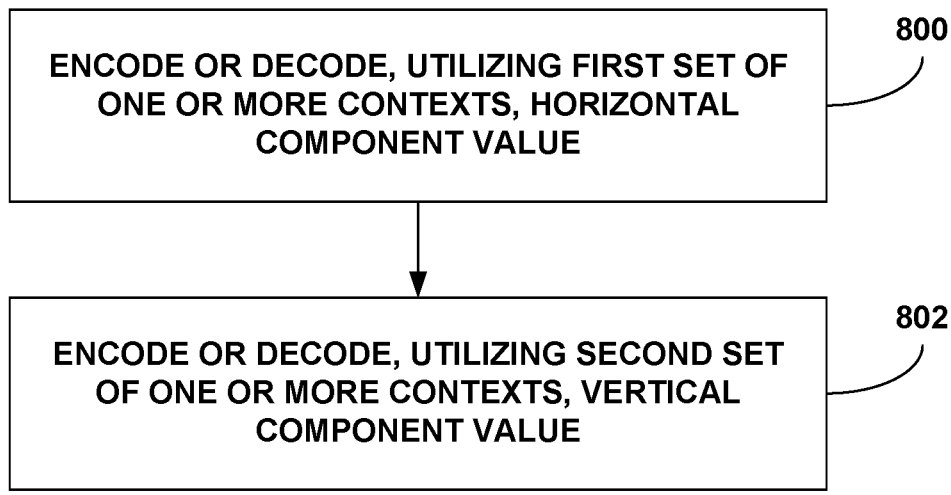
FIG. 8 is a flowchart illustrating an example method of encoding or decoding components of a block vector difference (BVD).

FIG. 8 is a flowchart illustrating an example method of encoding or decoding components of a block vector difference (BVD). Video encoder 200 and video decoder 300 may encode or decode, utilizing a first set of one or more contexts, a horizontal component value for the BVD based on the BVD horizontal component value being non-zero (800). Video encoder 200 and video decoder 300 may encode or decode, utilizing a second set of one or more contexts, a vertical component value based on a BVD vertical component value being non-zero (802). In one or more examples, the one or more contexts in the first set of contexts and the second set of contexts are different.

Figure 9:
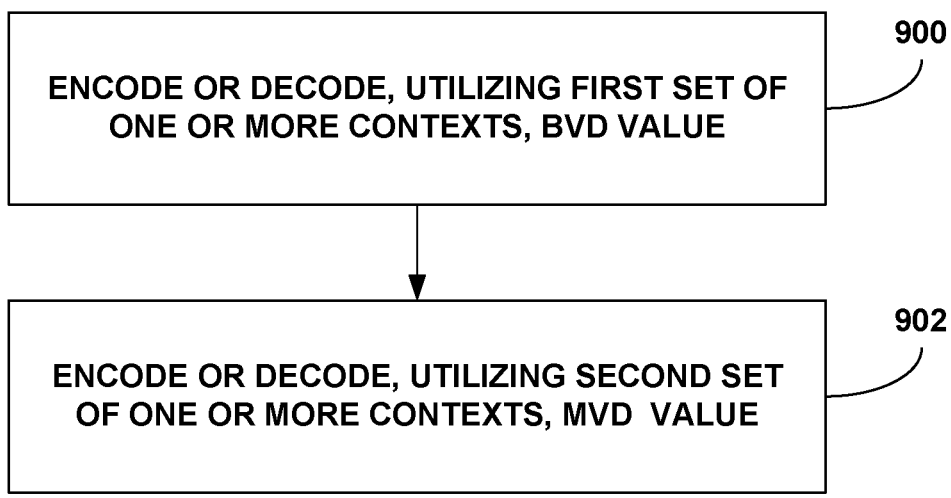
FIG. 9 is a flowchart illustrating an example method of encoding or decoding a BVD and a motion vector difference (MVD).

FIG. 9 is a flowchart illustrating an example method of encoding or decoding a BVD and a motion vector difference (MVD). Video encoder 200 and video decoder 300 may encode or decode, utilizing a first set of one or more contexts, a BVD value for a BVD for a block vector for a first block in a first picture (900). The BVD value is for a block vector for the first block that points to a reference block in the first picture. Video encoder 200 and video decoder 300 may encode or decode, utilizing a second set of one or more contexts, a MVD value for a MVD for a motion vector for a second block in a second picture (902). The motion vector for the second block identifies a block in a picture different than the second picture, and the MVD is indicative of a difference between the motion vector and a motion vector predictor.

The following describes one or more example techniques in accordance with examples described in this disclosure.

Clause 1. A method of coding video data, the method comprising: coding, utilizing a first set of one or more contexts, a motion vector difference (MVD) for a motion vector for a first block in a first picture of the video data, wherein the motion vector for the first block identifies a block in a picture different than the first picture, and wherein the MVD is indicative of a difference between the motion vector and a motion vector predictor; and coding, utilizing a second set of one or more contexts, a block vector difference (BVD) for a block vector for a second block in a second picture of the video data, wherein the block vector for the second block identifies a block in the second picture, and wherein the BVD is indicative of a difference between the block vector and a block vector predictor, wherein one or more contexts in the first set of contexts and the second set of contexts are different.

Clause 2. A method of coding video data, the method comprising: determining whether a block vector difference (BVD) is zero or not, wherein the BVD is indicative of a difference between a block vector for a current block of the video data and a block vector predictor; and context-based coding the BVD based on the BVD being non-zero, without determining whether an absolute value of the BVD is one.

Clause 3. A method of coding video data, the method comprising: determining whether a block vector difference (BVD) is zero or not, wherein the BVD is indicative of a difference between a block vector for a current block of the video data and a block vector predictor; based on the BVD being non-zero, determining whether the BVD is less than or equal to a threshold; selecting a binarization or inverse binarization technique based on whether the BVD is less than or equal to a threshold; and applying the selected binarization or inverse binarization technique.

Clause 4. A method of coding video data, the method comprising: context-coding, utilizing one or more contexts, a block vector difference (BVD), wherein the BVD is indicative of a difference between a block vector for a current block of the video data and a block vector predictor, wherein context-coding comprises utilizing the one or more contexts for a part of a binarization codeword of the BVD or for the whole binarization codeword of the BVD.

Clause 5. A method of coding video data, the method comprising: binarizing or inverse binarizing a horizontal component of a block vector difference (BVD) utilizing a first binarization technique, wherein the BVD is indicative of a difference between a block vector for a current block of the video data and a block vector predictor; and binarizing or inverse binarizing a vertical component of the BVD utilizing a second binarization technique that is different than the first binarization technique.

Clause 6. A method of coding video data, the method comprising: binarizing or inverse binarizing a horizontal and vertical component of a block vector difference (BVD) utilizing the same binarization technique, wherein the BVD is indicative of a difference between a block vector for a current block of the video data and a block vector predictor; context-based coding the horizontal component; and context-based coding the horizontal component.

Clause 7. The method of clause 6, wherein context-based coding the horizontal component and context-based coding the vertical component comprises context-based coding the vertical component and the horizontal component utilizing the same contexts.

Clause 8. The method of clause 6, wherein context-based coding the horizontal component and context-based coding the vertical component comprises context-based coding the vertical component and the horizontal component utilizing different contexts.

Clause 9. The method of clause 6, wherein context-based coding the horizontal component and context-based coding the vertical component comprises determining contexts for one of the horizontal component or the vertical component based on the other of the horizontal component or the vertical component.

Clause 10. A method of coding video data, the method comprising: determining a binarization or inverse binarization technique for a first component of a block vector difference (BVD) based on whether a second component of the BVD is positive or negative, wherein the BVD is indicative of a difference between a block vector for a current block of the video data and a block vector predictor, and wherein the first component is one of a horizontal or vertical component of the BVD, and the second component is the other of the horizontal or vertical component of the BVD; and applying the determined binarization or inverse binarization technique.

Clause 11. A method of coding video data, the method comprising: determining a binarization or inverse binarization technique for a first component of a block vector difference (BVD) based on a value of a second component of the BVD, wherein the BVD is indicative of a difference between a block vector for a current block of the video data and a block vector predictor, and wherein the first component is one of a horizontal or vertical component of the BVD, and the second component is the other of the horizontal or vertical component of the BVD; and applying the determined binarization or inverse binarization technique.

Clause 12. A method of coding video data, the method comprising: determining a binarization or inverse binarization technique for a first component of a block vector difference (BVD) and a second component of the BVD based on whether the first component and the second component are both positive, both negative, or one is positive and the other is negative, and wherein the BVD is indicative of a difference between a block vector for a current block of the video data and a block vector predictor, wherein the first component is one of a horizontal or vertical component of the BVD, and the second component is the other of the horizontal or vertical component of the BVD; and applying the determined binarization or inverse binarization technique.

Clause 13. The method of any of clauses 1-12, wherein the method comprising a method of decoding video data.

Clause 14. The method of any of clauses 1-12, wherein the method comprising a method of encoding video data.

Clause 15. A device for coding video data, the device comprising: memory configured to store the video data; and processing circuitry configured to perform the method of any one of clauses 1-14.

Clause 16. The device of clause 15, further comprising a display configured to display decoded video data.

Clause 17. The device of any of clauses 15 and 16, wherein the device comprises one or more of a camera, a computer, a mobile device, a broadcast receiver device, or a set-top box.

Clause 18. The device of any of clauses 15-17, wherein the device comprises a video decoder.

Clause 19. The device of any of clauses 15-17, wherein the device comprises a video encoder.

Clause 20. A computer-readable storage medium having stored thereon instructions that, when executed, cause one or more processors to perform the method of any of clauses 1-14.

Clause 21. A device for coding video data, the device comprising means for performing the method of any of clauses 1-14.

Clause 1A. A method of encoding or decoding video data, the method comprising: determining that a block vector difference (BVD) value is non-zero, wherein the BVD value is indicative of a difference between a block vector for a current block of the video data and a block vector predictor, and wherein the block vector points to a reference block based on samples in a same picture as the current block; and encoding or decoding a value for the BVD value, without signaling or parsing syntax information indicating whether an absolute value of the BVD value is greater than one.

Clause 2A. The method of clause 1A, wherein the value is equal to the absolute value of the BVD value minus one.

Clause 3A. The method of any of clauses 1A and 2A, wherein the value is represented as a codeword, wherein encoding or decoding the value comprises context-based encoding or decoding the codeword.

Clause 4A. The method of clause 3A, wherein context-based encoding or decoding the codeword comprises context-based encoding or decoding a first N bins of the codeword and bypass encoding or decoding remaining bins of the codeword.

Clause 5A. The method of clause 4A, wherein the first N bins comprise the first 5 bins of the codeword.

Clause 6A. The method of any of clauses 3A-5A, wherein the codeword is an Exponential-Golomb codeword.

Clause 7A. The method of any of clauses 1A-6A, wherein determining that the BVD value is non-zero comprises parsing a first flag indicating that the BVD value is non-zero, and wherein encoding or decoding the value based on the BVD value being non-zero, without signaling or parsing syntax information indicating whether the absolute value of the BVD value is greater than one comprises decoding the value without parsing a second flag indicating whether the absolute value of the BVD value is greater than one.

Clause 8A. The method of any of clauses 1A-7A, wherein the BVD value is a BVD horizontal component value, wherein the value is a horizontal component value, and wherein encoding or decoding the value based on the BVD value being non-zero comprises encoding or decoding, utilizing a first set of one or more contexts, the horizontal component value based on the BVD horizontal component value being non-zero, the method further comprising encoding or decoding, utilizing a second set of one or more contexts, a vertical component value based on a BVD vertical component value being non-zero, wherein the one or more contexts in the first set of contexts and the second set of contexts are different.

Clause 9A. The method of any of clauses 1A-8A, wherein the picture that includes the current block comprises a first picture, wherein the current block is a first block, and wherein encoding or decoding the value comprises encoding or decoding, utilizing a first set of one or more contexts, the value, the method further comprising: encoding or decoding, utilizing a second set of one or more contexts, a motion vector difference (MVD) for a motion vector for a second block in a second picture, wherein the motion vector for the second block identifies a block in a picture different than the second picture, and wherein the MVD is indicative of a difference between the motion vector and a motion vector predictor, wherein one or more contexts in the first set of contexts and the second set of contexts are different.

Clause 10A. The method of any of clauses 1A-9A, wherein encoding or decoding the value comprises decoding the value, the method further comprising: determining the block vector for the current block based on the BVD value; determining a prediction block based on the block vector; receiving residual information indicative of a difference between the prediction block and the current block; and reconstructing the current block based on the residual information and the prediction block.

Clause 11A. A device for encoding or decoding video data, the device comprising: memory configured to store video data; and processing circuitry configured to: determine that a block vector difference (BVD) value is non-zero, wherein the BVD value is indicative of a difference between a block vector for a current block of the video data and a block vector predictor, and wherein the block vector points to a reference block based on samples in a same picture as the current block; and encode or decode a value for the BVD value, without signaling or parsing syntax information indicating whether an absolute value of the BVD value is greater than one.

Clause 12A. The device of clause 11A, wherein the value is equal to the absolute value of the BVD value minus one.

Clause 13A. The device of any of clauses 11A and 12A, wherein the value is represented as a codeword, wherein to encode or decode the value, the processing circuitry is configured to context-based encode or decode the codeword.

Clause 14A. The device of clause 13A, wherein to context-based encode or decode the codeword, the processing circuitry is configured to context-based encode or decode a first N bins of the codeword and bypass encode or decode remaining bins of the codeword.

Clause 15A. The device of clause 14A, wherein the first N bins comprise the first 5 bins of the codeword.

Clause 16A. The device of any of clauses 13A-15A, wherein the codeword is an Exponential-Golomb codeword.

Clause 17A. The device of any of clauses 11A-16A, wherein to determine that the BVD value is non-zero, the processing circuitry is configured to parse a first flag indicating that the BVD value is non-zero, and wherein to encode or decode the value based on the BVD value being non-zero, without signaling or parsing syntax information indicating whether the absolute value of the BVD value is greater than one, the processing circuitry is configured to decode the value without parsing a second flag indicating whether the absolute value of the BVD value is greater than one.

Clause 18A. The device of any of clauses 11A-17A, wherein the BVD value is a BVD horizontal component value, wherein the value is a horizontal component value, and wherein to encode or decode the value based on the BVD value being non-zero, the processing circuitry is configured to encode or decode, utilizing a first set of one or more contexts, the horizontal component value based on the BVD horizontal component value being non-zero, wherein the processing circuitry is further configured to encode or decode, utilizing a second set of one or more contexts, a vertical component value based on a BVD vertical component value being non-zero, wherein the one or more contexts in the first set of contexts and the second set of contexts are different.

Clause 19A. The device of any of clauses 11A-18A, wherein the picture that includes the current block comprises a first picture, wherein the current block is a first block, and wherein to encode or decode the value, the processing circuitry is configured to encode or decode, utilizing a first set of one or more contexts, the value, wherein the processing circuitry is further configured to: encode or decode, utilizing a second set of one or more contexts, a motion vector difference (MVD) for a motion vector for a second block in a second picture, wherein the motion vector for the second block identifies a block in a picture different than the second picture, and wherein the MVD is indicative of a difference between the motion vector and a motion vector predictor, wherein one or more contexts in the first set of contexts and the second set of contexts are different.

Clause 20A. A computer-readable storage medium storing instructions thereon that when executed cause one or more processors to: determine that a block vector difference (BVD) value is non-zero, wherein the BVD value is indicative of a difference between a block vector for a current block of video data and a block vector predictor, and wherein the block vector points to a reference block based on samples in a same picture as the current block; and encode or decode a value for the BVD value, without signaling or parsing syntax information indicating whether an absolute value of the BVD value is greater than one.

Clause 21A. The computer-readable storage medium of clause 20A, further comprising instructions that cause the one or more processors to perform the method of any of clauses 1A-10A.

Clause 22A. A device comprising means for performing the method of any of clauses 1A-10A.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
    determining that a block vector difference (BVD) horizontal component value of a BVD is non-zero;
    determining that a BVD vertical component value of the BVD is non-zero, wherein the BVD horizontal component value and the BVD vertical component value are indicative of a difference between a block vector for a current block of the video data and a block vector predictor, and wherein the block vector points to a reference block based on samples in a same picture as the current block;
    encoding or decoding a first value for the BVD horizontal component value utilizing a first set of one or more contexts; and
    encoding or decoding a second value for the BVD vertical component value utilizing a second set of one or more contexts,
    wherein the one or more contexts in the first set of contexts and the second set of contexts are different.

2. The method of claim 1, wherein the first value is equal to an absolute value of the BVD horizontal component value minus one, and wherein the second value is equal to an absolute value of the BVD vertical component value minus one.

3. The method of claim 1, wherein the first value is represented as a codeword, wherein encoding or decoding the first value comprises context-based encoding or decoding the codeword.

4. The method of claim 3, wherein context-based encoding or decoding the codeword comprises context-based encoding or decoding a first N bins of the codeword and bypass encoding or decoding remaining bins of the codeword.

5. The method of claim 4, wherein the first N bins comprise the first 5 bins of the codeword.

6. The method of claim 3, wherein the codeword is an Exponential-Golomb codeword.

7. The method of claim 1,
    wherein determining that the BVD horizontal component value is non-zero comprises parsing a first flag, and
    wherein encoding or decoding the first value comprises decoding the first value without parsing a second flag indicating whether an absolute value of the BVD horizontal component value is greater than one.

8. The method of claim 1, wherein the picture that includes the current block comprises a first picture, and wherein the current block is a first block, the method further comprising:
    encoding or decoding, utilizing a third set of one or more contexts, a motion vector difference (MVD) for a motion vector for a second block in a second picture, wherein the motion vector for the second block identifies a block in a picture different than the second picture, and wherein the MVD is indicative of a difference between the motion vector and a motion vector predictor,
    wherein one or more contexts in the third set of contexts and at least one of the first set of contexts or the second set of contexts are different.

9. The method of claim 1, wherein encoding or decoding the first value comprises decoding the first value, the method further comprising:
    determining the block vector for the current block based on the first value;
    determining a prediction block based on the block vector;
    receiving residual information indicative of a difference between the prediction block and the current block; and
    reconstructing the current block based on the residual information and the prediction block.

10. A device for encoding or decoding video data, the device comprising:
    memory configured to store video data; and
    processing circuitry configured to:
        determine that a block vector difference (BVD) horizontal component value of a BVD is non-zero;

determine that a BVD vertical component value of the BVD is non-zero, wherein the BVD horizontal component value and the BVD vertical component value are indicative of a difference between a block vector for a current block of the video data and a block vector predictor, and wherein the block vector points to a reference block based on samples in a same picture as the current block;

encode or decode a first value for the BVD horizontal component value utilizing a first set of one or more contexts; and encode or decode a second value for the BVD vertical component value utilizing a second set of one or more contexts, wherein the one or more contexts in the first set of contexts and the second set of contexts are different.

11. The device of claim 10, wherein the first value is equal to an absolute value of the BVD horizontal component value minus one, and wherein the second value is equal to an absolute value of the BVD vertical component value minus one.

12. The device of claim 10, wherein the first value is represented as a codeword, wherein to encode or decode the first value, the processing circuitry is configured to context-based encode or decode the codeword.

13. The device of claim 12, wherein to context-based encode or decode the codeword, the processing circuitry is configured to context-based encode or decode a first N bins of the codeword and bypass encode or decode remaining bins of the codeword.

14. The device of claim 13, wherein the first N bins comprise the first 5 bins of the codeword.

15. The device of claim 12, wherein the codeword is an Exponential-Golomb codeword.

16. The device of claim 10,
wherein to determine that the BVD horizontal component value is non-zero, the processing circuitry is configured to parse a first flag, and
wherein to encode or decode the first value, the processing circuitry is configured to decode the first value without parsing a second flag indicating whether an absolute value of the BVD horizontal component value is greater than one.

17. The device of claim 10, wherein the picture that includes the current block comprises a first picture, wherein the current block is a first block, and the value, wherein the processing circuitry is further configured to:

encode or decode, utilizing a third set of one or more contexts, a motion vector difference (MVD) for a motion vector for a second block in a second picture, wherein the motion vector for the second block identifies a block in a picture different than the second picture, and wherein the MVD is indicative of a difference between the motion vector and a motion vector predictor, wherein one or more contexts in the third set of contexts and at least one of the first set of contexts or the second set of contexts are different.

18. A non-transitory computer-readable storage medium storing instructions thereon that when executed cause one or more processors to:

determine that a block vector difference (BVD) horizontal component value of a BVD is non-zero;

determine that a BVD vertical component value of the BVD is non-zero, wherein the BVD horizontal component value and the BVD vertical component value are indicative of a difference between a block vector for a current block of video data and a block vector predictor, and wherein the block vector points to a reference block based on samples in a same picture as the current block;

encode or decode a first value for the BVD horizontal component value utilizing a first set of one or more contexts; and encode or decode a second value for the BVD vertical component value utilizing a second set of one or more contexts, wherein the one or more contexts in the first set of contexts and the second set of contexts are different.

* * * * *